(12) United States Patent
Jia et al.

(10) Patent No.: US 11,146,063 B1
(45) Date of Patent: *Oct. 12, 2021

(54) RENEWABLE POWER TRANSMISSION LINE USING THE SQUARE ERROR METHOD

(71) Applicant: NORTH CHINA ELECTRIC POWER UNIVERSITY, Beijing (CN)

(72) Inventors: Ke Jia, Beijing (CN); Tianshu BI, Beijing (CN); Liming Zheng, Beijing (CN)

(73) Assignee: North China Electric Power University, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/201,128

(22) Filed: Mar. 15, 2021

Related U.S. Application Data

(63) Continuation of application No. 17/001,175, filed on Aug. 24, 2020, now Pat. No. 10,985,558.

(51) Int. Cl.
*H02J 3/00* (2006.01)
*H02H 1/00* (2006.01)
*H02J 13/00* (2006.01)
*H02H 7/22* (2006.01)
(Continued)

(52) U.S. Cl.
CPC ...... *H02J 3/00125* (2020.01); *G05B 19/0428* (2013.01); *H02H 1/0007* (2013.01); *H02H 1/0092* (2013.01); *H02H 7/228* (2013.01); *H02J 13/00002* (2020.01);
(Continued)

(58) Field of Classification Search
CPC ........ G05B 19/0428; G05B 2219/2619; G05B 2219/2639; H02H 1/0007; H02H 1/0092; H02H 7/228; H02J 13/00002; H02J 2300/28; H02J 3/00125; H02J 3/381
See application file for complete search history.

(56) References Cited

U.S. PATENT DOCUMENTS

2013/0096854 A1* 4/2013 Schweitzer, III .... G01R 31/085
702/59

FOREIGN PATENT DOCUMENTS

EP  340936 A1 * 7/2018 ............... H02G 7/26

OTHER PUBLICATIONS

Zheng, L. et al., A Novel Structural Similarity Based Pilot Protection for Renewable Power Transmission Line, pp. 1-10, 2020: DOI 10.1109/TPWRD.2020.2973505, IEEE [Cited in U.S. Appl. No. 17/011,175, filed Aug. 24, 2020].

* cited by examiner

*Primary Examiner* — Kidest Bahta
(74) *Attorney, Agent, or Firm* — Hunton AK, LLP

(57) ABSTRACT

The wide application of power electronic components in power systems with renewable energy sources has changed the fault characteristics of conventional power systems, resulting in the performance degradation of conventional protections. To solve these problems, a novel principle of pilot protection based on structural similarity and square error criteria is provided. The structural similarity criterion utilizes the difference of fault characteristics between renewable sources and synchronous generators to identify internal faults, and the square error criterion is used to solve abnormal calculation of the conventional similarity based protection. Compared with conventional differential protections, the disclosed protection shows excellent performance in speed and reliability during various faults.

1 Claim, 8 Drawing Sheets

(51) Int. Cl.
*G05B 19/042* (2006.01)
*H02J 3/38* (2006.01)
(52) U.S. Cl.
CPC ............... *G05B 2219/2619* (2013.01); *G05B 2219/2639* (2013.01); *H02J 3/381* (2013.01); *H02J 2300/28* (2020.01)

US 11,146,063 B1

RENEWABLE POWER TRANSMISSION LINE USING THE SQUARE ERROR METHOD

CROSS-REFERENCE TO RELATED APPLICATIONS

This application is a continuation of U.S. application Ser. No. 15/449,447, filed on Mar. 3, 2017 in the US Patent and Trademark Office, patented as U.S. Pat. No. 10,985,558 B1, entitled "A STRUCTURAL SIMILARITY BASED PILOT PROTECTION METHOD AND SYSTEM FOR RENEWABLE POWER TRANSMISSION LINE" which are incorporated herein by reference in their entirety.

FIELD OF THE INVENTION

The present disclosure relates generally to fault location and protection of power distribution system, and more particularly, to novel structural similarity based pilot protection methods and systems for renewable power transmission line.

BACKGROUND

Due to the reverse distribution between energy resources and electric demand, the integrations of large-scale renewable energy power plants are being considered in order to alleviate the increasingly severe energy crisis and environmental pollution. However, the centralized grid-connected power electronic devices in large-scale renewable power plants have changed the fault characteristics of power systems. These fault characteristics changes may include limited amplitude, frequency offset, phase angle controlled distortion, and non-fundamental frequency and low-order harmonics. The conventional differential protections are affected by such fault characteristics changes. At present, the conventional differential protections are still operational, however, their sensitivity is reduced. With the increase of the renewable energy sources and voltage source converters-high voltage direct current transmission (VSC-HVDC), fault currents provided by the renewable power sources and the grid are reducing. Therefore, the problems associated with conventional phasor measurement and amplitude comparison based protections can result in a higher likelihood of malfunction. It is difficult for the configuration and setting of traditional protections to satisfy the sensitivity and reliability requirements at the same time. An incorrect action of protections can affect the safe operation of power system with renewable energy power sources. Therefore, there is a need for a novel protection principle adapted to the integration of renewable energy sources to ensure the safe and stable operation of renewable power system.

SUMMARY

Aspects of the disclosed technology include novel structural similarity based pilot protection methods and systems for renewable power transmission line.

Embodiments of the present disclosure provide for a structural similarity based pilot protection system for a transmission line of a renewable energy integrated power system. The renewable energy integrated power system comprises: a first current transformer (CT) disposed in a first end portion of the transmission line, the first CT configured to connect a renewable energy source to the transmission line; and a second CT disposed in a second end portion of the transmission line, the second end portion being opposite to the first end portion and the second CT configured to connect the transmission line to an external synchronous grid. The structural similarity based pilot protection system comprises a protection device and a controller configured to control the protection device, the controller and the protection device being in signal communication with the renewable energy integrated power system. The controller is configured to: start the protection device; sample current signals by the protection device from the first end portion and the second end portion, respectively; apply a wavelet transform to the sampled current signals of the first end portion to obtain a first two-dimensional wavelet coefficient matrix; apply the wavelet transform to the sampled current signals of the second end portion to obtain a second two-dimensional wavelet coefficient matrix; construct a first three-dimensional image based on the first two-dimensional wavelet coefficient matrix; construct a second three-dimensional image based on the second two-dimensional wavelet coefficient matrix; determine a structural similarity value between the first three-dimensional image and the second three-dimensional image; determine a low structural similarity threshold and a high structural similarity threshold, the high structural similarity threshold being greater than the low structural similarity threshold; determine whether the structural similarity value is greater than the low structural similarity threshold and less than the high structural similarity threshold; in response to that the structural similarity value is determined to be greater than the low structural similarity threshold and less than the high structural similarity threshold, determine that an internal fault has occurred to the transmission line; in response to that the internal fault is determined, cause the protection device to generate a trip signal to cut off the internal fault; in response to that the structural similarity value is determined to be less than or equal to the low structural similarity threshold, determine a residual sum of squares between the first two-dimensional wavelet coefficient matrix and the second two-dimensional wavelet coefficient matrix; determine a threshold of residual sum of squares; determine whether the residual sum of squares is greater than the threshold of residual sum of squares; in response to that the structural similarity value is determined to be less than or equal to the low structural similarity threshold and the residual sum of squares is determined to be greater than the threshold of residual sum of squares, determine that an internal fault has occurred to the transmission line, and cause the protection device to generate a trip signal to cut off the internal fault; and in response to that the structural similarity value is determined to be greater than the high structural similarity threshold, or the residual sum of squares is less than or equal to the threshold of residual sum of squares, determine that an external fault has occurred to the transmission line, and restore the protection device to a normal state.

Embodiments of the present disclosure provide a structural similarity based pilot protection method for a transmission line of a renewable energy integrated power system. The renewable energy integrated power system comprises: a first current transformer (CT) disposed in a first end portion of the transmission line, the first CT configured to connect a renewable energy source to the transmission line; a second CT disposed in a second end portion of the transmission line, the second end portion being opposite to the first end portion and the second CT configured to connect the transmission line to an external synchronous grid; a protection device; and a controller configured to control the protection device. The structural similarity based pilot protection method comprises: starting, by the controller, the protection device;

sampling current signals by the protection device from the first end portion and the second end portion, respectively; applying, by the controller, a wavelet transform to the sampled current signals of the first end portion to obtain a first two-dimensional wavelet coefficient matrix; applying, by the controller, the wavelet transform to the sampled current signals of the second end portion to obtain a second two-dimensional wavelet coefficient matrix; constructing, by the controller, a first three-dimensional image based on the first two-dimensional wavelet coefficient matrix; constructing, by the controller, a second three-dimensional image based on the second two-dimensional wavelet coefficient matrix; determining, by the controller, a structural similarity value between the first three-dimensional image and the second three-dimensional image; determining, by the controller, a low structural similarity threshold and a high structural similarity threshold, the high structural similarity threshold being greater than the low structural similarity threshold; determining, by the controller, whether the structural similarity value is greater than the low structural similarity threshold and less than the high structural similarity threshold; in response to that the structural similarity value is determined to be greater than the low structural similarity threshold and less than the high structural similarity threshold, determining, by the controller, that an internal fault has occurred to the transmission line; in response to that the internal fault is determined, causing, by the controller, the protection device to generate a trip signal to cut off the internal fault; in response to that the structural similarity value is determined to be less than or equal to the low structural similarity threshold, determining, by the controller, a residual sum of squares between the first two-dimensional wavelet coefficient matrix and the second two-dimensional wavelet coefficient matrix; determining, by the controller, a threshold of residual sum of squares; determining, by the controller, whether the residual sum of squares is greater than the threshold of residual sum of squares; in response to that the structural similarity value is determined to be less than or equal to the low structural similarity threshold and the residual sum of squares is determined to be greater than the threshold of residual sum of squares, determining, by the controller, that an internal fault has occurred to the transmission line, and causing the protection device to generate a trip signal to cut off the internal fault; and in response to that the structural similarity value is determined to be greater than the high structural similarity threshold, or the residual sum of squares is less than or equal to the threshold of residual sum of squares, determining, by the controller, that an external fault has occurred to the transmission line, and restoring the protection device to a normal state.

Further features of the disclosed systems and methods, and the advantages offered thereby, are explained in greater detail hereinafter with reference to specific example embodiments illustrated in the accompanying drawings.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
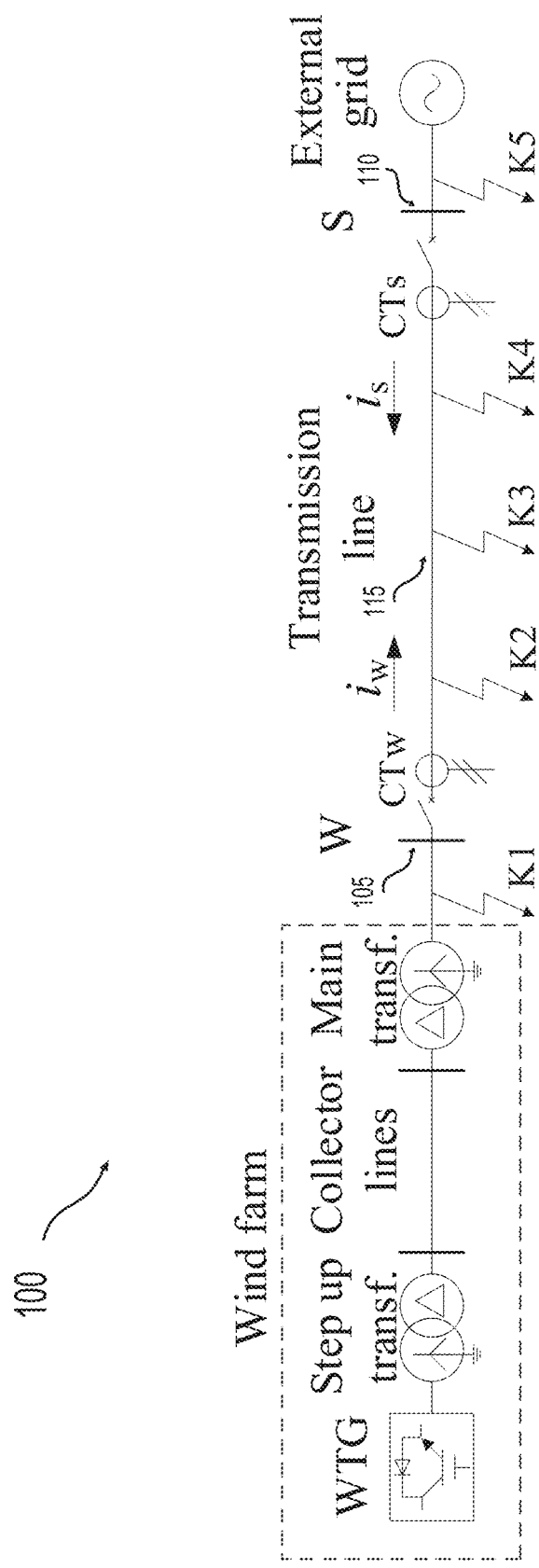
FIG. 1 shows an example primary system diagram of a renewable energy power plant according to an embodiment of the present disclosure.

Exemplary embodiments of the invention will now be described in order to illustrate various features of the invention. The embodiments described herein are not intended to be limiting as to the scope of the invention, but rather are intended to provide examples of the components, use, and operation of the invention. The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The wide application of power electronic components in power system with renewable energy sources has changed the fault characteristics of conventional power system, resulting in the performance degradation of conventional protections, and even the risk of malfunction and action rejection. This brings challenges to the security and stability of the power grid. Therefore, in order to solve these problems, a novel principle of pilot protection based on structural similarity and square error criteria is disclosed herein. The structural similarity criterion utilizes the difference of fault characteristics between renewable sources and synchronous generators to identify internal faults, and the square error auxiliary criterion is used to solve abnormal calculation of the conventional similarity based protections. The detailed model of grid-connected renewable energy power plant is built in Real Time Digital Simulator (RTDS) and the disclosed protection algorithm is solidified in the industrial protection device. The effectiveness of the disclosed principle is verified by hardware-in-loop dynamic simulation experiments. Compared with conventional differential protections, the disclosed protection shows excellent performance in speed and reliability during various faults. In addition, a field short-circuit test is carried out in a real wind farm to verify the effectiveness of the disclosed protection scheme. It is proved that the disclosed protection method can be implemented in industrial applications.

I. Introduction

In order to ensure the safe and efficient use of renewable energy power, the protection principle adapted to the renewable energy power plants has been reported in the literature. For example, a communication based adaptive current protection has been used, which calculates short-circuit current on-line, and modifies protection constant in real time to form an adaptive protection. In another example, data collected by phasor measurement unit (PMU) are processed and are used to compute differential features. In a further example, using a large amount of data to train classifiers, an intelligent protection is used. In addition, coordination of overcurrent relays for wind power plants has been investigated by different methods. The above methods are based on the protection principle of power frequency phasor. The amplitude of power frequency current is smaller than the rotor-speed-related frequency component after the crowbar bar circuit of type-III wind generators operates. The rotor-speed-related frequency component can have a great impact on the power frequency phasor based protection, which leads to the performance degradation of those protection principles.

To solve the performance degradation of the above protection principles based on power frequency phasor, the protection principle based on time domain quantity has been studied. For example, Pearson correlation coefficient and similarity distance are used to characterize the difference of transient current waveforms between renewable energy power plants and synchronous generators. A type of pilot protection based on waveforms of transient current has been investigated. However, this method relies entirely on the difference of waveforms on both sides of the transmission line. In the case of low output of renewable energy sources (e.g., no wind or no light), there is a risk of performance degradation or even inaccurate operation of the protection principle. In summary, there is still a lack of reliable protection principle for the outgoing transmission lines connected to renewable energy sources.

Conventionally, on one hand, it is difficult to describe the amplitude of different frequency signals only using time domain information to form a new protection principle. On the other hand, using frequency domain information only cannot accurately reflect the transient electrical quantity during faults. In the present disclosure, the structural similarity (SSIM) disclosed herein makes full use of information in both time domain and frequency domain to solve the problem of performance degradation of power frequency based protections. The conventional protection principle based on the similarity of transient current waveform cannot operate correctly in the situations where the weak output of the renewable energy sources and/or protection devices reclosing with permanent fault occur. The disclosed protection method also solves this problem associated with the conventional similarity based protection.

In this disclosure, according to the actual topology and parameters of renewable energy power sources, a detailed model of integrated wind farms is constructed in real-time digital simulator (RTDS), and the disclosed protection algorithm is compiled into the general protection device. A hardware-in-loop dynamic simulation experiment system is established by the RTDS and the general protection device. The simulation system verifies the performance of the disclosed protection, and a field short-circuit test further verifies the effectiveness of the disclosed protection according to the real fault transients.

II. Fault Characteristics Analysis of Renewable Energy Sources

The analysis of fault characteristics is the basis of the novel protection principle disclosed herein. This disclosure provides the analytic expressions of transient current of various renewable energy sources, and the fault characteristics of renewable energy power sources are analyzed during normal operation.

Renewable energy power plants can be divided into two main categories: full power inverter power supply (represented by type-IV wind generators) and partial inverter power supply (represented by type-III wind generators). In this disclosure, type-III wind generators and type-IV wind generators are selected to represent two kinds of renewable energy power sources. Based on the conventional research, the analytical expressions of transient short-circuit current of type-III wind generators and type-IV wind generators during faults can be obtained as follows in equations (1) and (2), respectively.

$$i_{\varphi-III} = -\frac{k_r}{L_s'}\varphi_{r0}e^{-t/T_r'}e^{j\omega_r t} + \frac{(1-\lambda')e_0}{j\omega L_s'}e^{j\omega t} + \frac{\lambda e_0}{j\omega L_s'}e^{-t/T_s'} \quad (1)$$

where $i_{\varphi-III}$ is the fault current provided by the type-III wind generator; $k_r$ is a coefficient related to the inductances of the wind farms; $L_s'$ is the equivalent inductance of the stator, which can be expressed as: $L_s'=L_s-(L_m^2/L_r)$; $L_s=L_{sl}+L_m$; $L_r=L_{rl}+L_m$; $\varphi_{r0}$ is rotor flux before fault; $e_0$ is the terminal voltage amplitude before fault; $T_r'$ and $T_s'$ are the decay time constants of rotors and stators, respectively, and they can be expressed as: $T_r'=L_r'/R_r$; $T_s'=L_s'/R_s$; $\omega_r$ is the angular frequency related to speed of rotor; $\lambda'$ is the voltage drop correlation coefficient; and $\lambda$ is the depth of the voltage dip.

After the operation of the crowbar circuit, the wind turbine operates in asynchronous motor state. The stator winding produces a high proportion of the rotor-speed-related frequency component. This component generally deviates from power frequency, and it depends on the rotor speed.

$$i_{\varphi-IV} = i_d^* \cos(\omega_{PLL}t + \theta_\varphi) - i_q^* \sin(\omega_{PLL}t + \theta_\varphi) + \quad (2)$$
$$(i_{d0} - i_d^*)\frac{1}{\sqrt{1-\xi^2}}e^{-\xi\omega_n t}\sin(\omega_d t + \alpha) \cdot \cos(\omega_{PLL}t + \theta_\varphi) +$$
$$i_q^* e^{-(k_{ip}/2L)} \frac{2\sqrt{Lk_{ii}}}{\sqrt{4k_{ii}L - k_{ip}^2}} \cdot \sin\left(\frac{\sqrt{4k_{ii}L - k_{ip}^2}}{2L}t + \beta\right)\sin(\omega_{PLL}t + \theta_\varphi)$$

where $i_{\varphi-IV}$ is the fault current of II-REG (type-IV wind farm) under three-phase of ABC coordinate; $i_d^*$ and $i_q^*$ are commands of current in dq-coordinate; $\xi$ is the damping ratio, and its value is shown as: $\xi=k_\varphi/2\sqrt{Lk_{ii}}$; $\omega_d$ is the damped oscillation frequency, whose value is represented as: $\varphi_d = \omega_n\sqrt{1-\xi^2}$ and $\omega_n$ can be expressed as: $\omega_n = \sqrt{k_{ii}/L}$; $\beta = \arctan\sqrt{1-\xi^2}/\xi$; $\theta_\varphi$ represents the initial phase angle after three-phase fault; and $\psi_{PLL}$ is the angular frequency detected by phase-locked loop (PLL).

In the equation (2), $i_d^*$ and $i_q^*$ are commands of current in the control system; $k_{ii}$ and $k_{ip}$ are the integral constant and the proportionality constant in the control system, respectively. Therefore, the second and fourth terms on the right side of the equation (2) depend on the control system.

According to the equation (1), when the crowbar circuit is put into operation the rotor current decays rapidly, which causes the fault transient current of type-III wind generator to include the power frequency component, the decaying rotor-speed-related frequency component and the decaying DC component. The fault transient current is dominated by the rotor-speed-related frequency component, and the fault characteristic is thus characterized by the non-power frequency waveform.

According to the equation (2), on one hand, the fault current provided by type-IV wind generator is limited by the reference value of dq-axis, which shows the characteristic of limited amplitude. On the other hand, the frequency of the fault current in the equation (2) will deviate from the power frequency, because the phase-locked loop (PLL) has the dynamic response process. Therefore, the fault current has the non-power frequency characteristic of limited amplitude.

In conclusion, the short-circuit current of the two kinds of renewable energy power sources is mainly characterized by the non-power frequency with limited amplitude, which is significantly different from the power frequency sinusoidal short-circuit current provided by the synchronous generator. According to the fault characteristics of renewable energy power sources and synchronous generators, the formula of short-circuit current can be obtained in equation (3). When an internal fault occurs, the fault current waveforms on both sides of the transmission line are different. When an external fault occurs, the current waveforms on both sides are practically same according to the Kirchhoff's law. Based on these characteristics, a comprehensive criterion of pilot protection based on structural similarity and square error is constructed in this disclosure.

$$I_w = A_{WPF}W_{PF}(t) + A_{WNPF}W_{NPF}(t) + A_{WH}W_H(t)$$

$$I_s = A_{SPF}S_{PF}(t) + A_{SA}S_A(t) \qquad (3)$$

where $I_w$ and $I_s$ are the fault currents of wind farm and AC system, respectively. $A_{WPF}W_{PF}(t)$, $A_{WNPF}W_{NPF}(t)$ and $A_{WH}W_H(t)$ are the power frequency component, non-power frequency component, and harmonic component of renewable energy sources, respectively. $A_{SPF}S_{PF}(t)$ and $A_{SA}S_A(t)$ are the power frequency component, and the aperiodic component of AC system, respectively.

These formulas (equations (1)-(3)) indicate that the current characteristics of the renewable energy sources depend on the response of controllers. Due to the variable parameters and performances of controllers, there are significant differences between the fault current of renewable energy sources and the fault current of synchronous generators.

III. Pilot Protection Based on Structural Similarity and Square Error Method

A. Data Preprocessing

An example primary system diagram 100 of a renewable energy power plant (e.g., an integrated wind farm) is shown in FIG. 1 according to an example embodiment of the present disclosure. As shown in FIG. 1, $CT_w$ and $CT_s$ are current transformers on the W (wind farm) side and S (system) side, respectively. The positive direction of current is from the bus 105 and the bus 110 to the transmission line 115. In some embodiments, single dimensional information (e.g., time domain or frequency domain) can be used for the protection disclosed herein. However, it may be difficult to ensure the reliability of protection using single dimensional information due to the unique fault characteristics of renewable sources. Thus, information in both time domain and frequency domain is used in this example embodiment. The original data is obtained by the corresponding protection device from the W side and the S side, respectively. The original data comprises a set of current sampling values. After the wavelet transform of the original data on the W side, a matrix X of wavelet coefficient amplitudes can be calculated from the sampling data on the W side. The matrix X comprises the amplitudes of wavelet coefficients at different times and frequencies. After the wavelet transform of the original data on the S side, a matrix Y of wavelet coefficient amplitudes can be obtained from the sampling data on the S side. The matrix Y comprises the amplitudes of wavelet coefficients at different times and frequencies. The process of obtaining the matrix Y is similar to the process of obtaining the matrix X.

Wavelet transform can take advantage of scale expansion and shift to analyze signal in multi-scale detailed processing, which can solve the contradiction between time-domain window length and frequency resolution associated with Fourier transform. Therefore, wavelet transform is widely used in signal processing, image recognition and other fields. In this disclosure, Morlet complex wavelet transform is used as an example wavelet transform technique to extract the frequency domain characteristic of current waveform in real time, and to preprocess the sampling data. The formulas of wavelet transform and mother wavelet function are given below in equation (4).

$$W_f(a,b) = |a|^{-1/2} \int_R f(t) \cdot \psi^*\left(\frac{t-b}{a}\right) dt \qquad (4)$$

$$\psi(t) = \frac{1}{\sqrt{f_b\pi}} e^{j2\pi f_c t} \cdot e^{-t^2/f_b}$$

where $W_f$ is the coefficient of wavelet transform; a and b represent scaling factor and translation factor, respectively; f(t) is the signal to be processed, and the signals are the fault currents of renewable sources $I_w$ and AC system $I_s$. The amplitude matrices of the wavelet coefficients of $I_w$ and $I_s$ are recorded as X and Y. $\psi(t)$ is the mother wavelet function. $\psi^*$ is the conjugation of the mother wavelet function. $f_b$ and $f_c$ are the cut-off frequency and center frequency, respectively.

According to the above analysis, a two-dimensional wavelet coefficients matrix can be obtained after preprocessing of the sampled current data by the wavelet transform. The two dimensions of the wavelet coefficients matrix comprise a time dimension and a frequency dimension. In a three-dimensional coordinate system, three-dimensional images related to current sampling can be constructed by setting the x-axis as time, y-axis as frequency and z-axis as wavelet coefficient amplitude. Specifically, in this example embodiment, a first three-dimensional image can be constructed using the X matrix for the sampled current data on the W side of the transmission line, and a second three-dimensional image can be constructed using the Y matrix for the sampled current data on the S side of the transmission line. From the analysis in the section II of this disclosure above, it can be seen that the first and second three-dimensional images related to wavelet coefficients of fault currents are structurally different during an internal fault with respect to the transmission line, whereas the first and second three-dimensional images can be structurally the same during an external fault or normal operation of the transmission line. Therefore, the image structural similarity algorithm can be used to identify internal and external faults with respect to the transmission line.

B. Structural Similarity and Square Error Method Based Pilot Protection

1) Principle of Structural Similarity

In the image processing, the structural similarity (SSIM) is used to measure the similarity between two images. It may classify images from three perspectives: mean, variance and covariance, which can distinguish the differences between different images efficiently and accurately. The formula of structural similarity can be as follows in equation (5).

$$SSIM(X, Y) = \frac{(2\mu_X\mu_Y + C_1)(2\sigma_{XY} + C_2)}{(\mu_X^2 + \mu_Y^2 + C_1)(\sigma_X^2 + \sigma_Y^2 + C_2)} \quad (5)$$

where SSIM(X,Y) is the structural similarity between two images. X and Y are the wavelet coefficient amplitudes matrix data corresponding to the two images, which are obtained from both sides of the transmission line (i.e., the W side and the S side) after wavelet transform being performed on the sampled current data. $\mu_X$ and $\mu_Y$ are the mean values of X and Y respectively. $\sigma_X$ and $\sigma_Y$ are the variances of X and Y respectively. $\sigma_{XY}$ is the covariance between X and Y. $C_1$ and $C_2$ are the stability factors. For example, $C_1$ may be determined using $C_1=(k_1 \cdot L)^2$, and $C_2$ may be determined using $C_2=(k_2 \cdot L)^2$, where $k_1=0.01$ and $k_2=0.03$ may be used. L is the difference between the maximum value and the minimum value of the matrix X or the matrix Y, respectively.

Since the structural similarity is calculated by using the amplitudes of the wavelet coefficients corresponding to the current sampling values, it can be seen that the calculated value of the structural similarity is within a range from about 0 to about 1 according to the equation (5). The structural similarity tends to be about 1 during normal operation of the transmission line and an external fault. When an internal fault occurs, the value of the structural similarity is less than 1 and greater than 0, so a constant value can be set to distinguish an internal fault and an external fault.

In the case of weak output of renewable energy power plants and/or reclosing with the permanent fault, the current amplitude of the W side of the transmission line is about 0, and the corresponding wavelet coefficient matrix elements are all about 0. At this time, the calculated value of structural similarity is determined by the stability coefficients (both $C_1$ and $C_2$) in the numerator of the equation (5), and its value approaches to 0, which may not be able to be relied on for identifying faults. Thus, square error method can be used to identify faults in situations where weak output of renewable energy power plants and/or reclosing with the permanent fault occurs.

2) Principle of Square Error Method

Square error method is generally used to describe the difference between two groups of data, and its formula can be as follows in equation (6).

$$Sq(X,Y)=\Sigma(x_{ij}-y_{ij})^2 \quad (6)$$

where Sq(X,Y) is the residual sum of squares. E is a summation indicating traversing all elements of the matrix X and the matrix Y. $x_{ij}$ and $y_{ij}$ are values of row i and column j in the matrix X and the matrix Y, respectively.

According to the equation (5), the fault current provided by renewable energy power sources is 0 during reclosing with permanent fault and/or weak output of renewable sources. The fault current on the S side embodies the characteristics of the synchronous generator, which presents attenuated power frequency sinusoidal wave characteristics. At this time, the calculated value of structural similarity tends to be zero, and the square error method can then be used to identify faults. From the above analysis, it can be seen that the square error method can accurately reflect the internal and external faults by setting reasonable protection values based on load current.

3) Comprehensive Criterion of Novel Pilot Protection

A comprehensive criterion of pilot protection is constructed by using structural similarity and square error method. The structural similarity tends to be 1 during normal operation of the transmission line and an external fault. When an internal fault occurs, the structural similarity is less than 1 and greater than 0. Therefore, the structural similarity can be used to identify faults in the normal operation of the transmission line. Under the abnormal scenarios in which the weak output of renewable energy power sources and/or reclosing with permanent fault occurs, the structural similarity tends to be 0. In order to exclude the influence of the current transformer disconnection, the criterion of square error method is used to identify faults in such scenarios. In summary, the comprehensive criteria of pilot protection based on structural similarity and square error method are as follows in equation (7).

$$\begin{cases} S_{lset} < SSIM(X, Y) < S_{hset} & ① \\ SSIM(X, Y) \leq S_{lset} \cap Sq(X, Y) > E_{set} & ② \end{cases} \quad (7)$$

where ① is the criteria of the structural similarity, which is used during the normal operation of the transmission line. ② is the criteria of the square error method, which is used in the abnormal scenarios of zero sampling current value on the W side. $S_{lset}$ is a low threshold constant of the structural similarity criteria while $S_{hset}$ is a high threshold constant of structural similarity criteria. $E_{set}$ is a threshold constant of the square error method criteria.

C. Setting of Protection Constants

In order to construct a complete protection algorithm, it is necessary to determine the protection constants. There are three constant values in the comprehensive criterion. The high and low constant values in criterion ① are determined by the current transformer (CT) amplitude error and margin coefficient of both CTs and CTw. According to the analysis in the subsection B of section III, the high constant value can be set on the basis of 1 while the low constant value can be set on the basis of 0. The low and high constants can be determined as follows in equation (8).

$$S_{hset}=1 \cdot K_{mag} \cdot K_{mar}$$

$$S_{lset}=1 \cdot K_{mag} \cdot K_{mar} \quad (8)$$

where $K_{mag}$ is the amplitude error coefficient. $K_{mar}$ is the margin coefficient.

As shown, the protection constant $S_{lset}$ has already been determined in the equation (8), and the constant $E_{set}$ can be determined by the following formula in equation (9).

$$E_{set}=(1+K_{mag} \cdot K_{mar}) \cdot I_{Load}^2 \qquad (9)$$

Considering the possible maximum value of the above CT amplitude errors and a certain margin, $K_{mag}$ may be set to be 0.95, and $K_{mar}$ may be set as 0.95. The wavelet coefficient corresponding to the maximum load current can be 1 p.u. From the equations (8) and (9), $S_{lset}$ and $S_{hset}$ can be calculated as 0.10 and 0.90, while $E_{set}$ can be calculated as 1.90 p.u.

Figure 2:
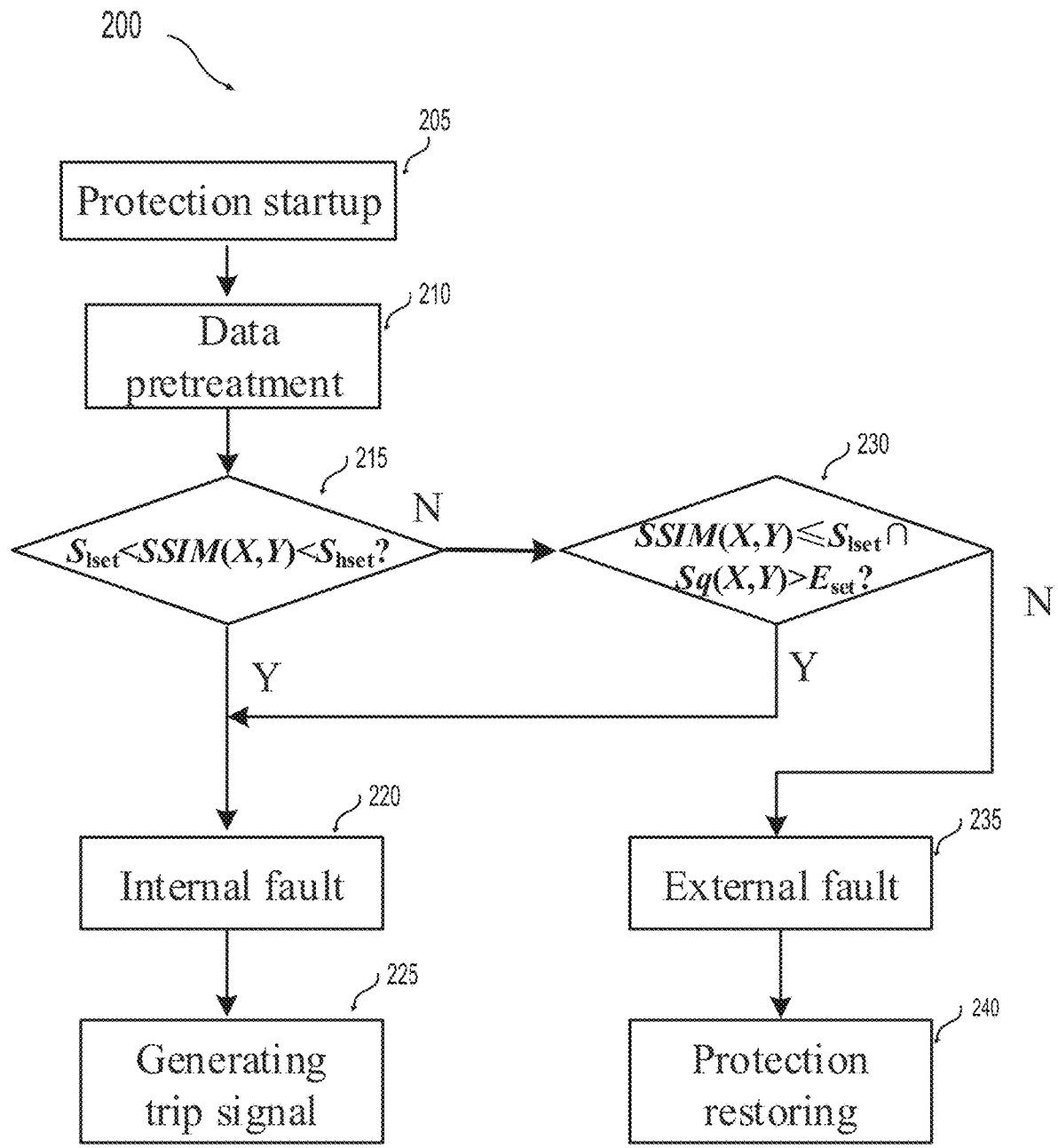
FIG. 2 shows a flow chart of an example novel structural similarity based protection method for renewable power transmission line according to an embodiment of the present disclosure.

FIG. 2 illustrates a flow chart of a novel structural similarity based protection method 200 for renewable power transmission line according to an example embodiment. The method 200 may be implemented in the example primary system diagram 100 of a renewable energy power plant as shown in FIG. 1. The method 200 may comprise the following steps.

In step 205, a protection device is started. The protection device can be in data communication with the primary system 100 of the renewable energy power plant, for example, by means of an optical fiber communication. The protection device may be controlled by a controller to perform various functions.

In step 210, after the protection device is started, current signals are sampled by the protection device from a first end portion of the transmission line and a second end portion of the transmission line, respectively. The first end portion of the transmission line is opposite to the second end portion of the transmission line. For example, the first end portion of the transmission line can be a portion of the transmission line on the CTw side in FIG. 1, and the second end portion of the transmission line can be a portion of the transmission line on the CTs side in FIG. 1. The sampled current signals of the opposite two sides can be transmitted to the protection device and the controller through the optical fiber communication.

A wavelet transform is applied by the controller to the sampled current signals of the first end portion to obtain a first two-dimensional wavelet coefficient matrix, in which one dimension is in the time domain and the other dimension is in the frequency domain. Similarly, the wavelet transform is applied by the controller to the sampled current signals of the second end portion to obtain a second two-dimensional wavelet coefficient matrix, in which one dimension is in the time domain and the other dimension is in the frequency domain. The wavelet transform can be the wavelet transform shown in the equation (4).

A first three-dimensional image is constructed by the controller based on the first two-dimensional wavelet coefficient matrix (referred to as X matrix). The first three-dimensional image may be constructed in a three-dimensional coordinate system in which the x-axis is a time coordinate, the y-axis is a frequency coordinate, and the z-axis is a wavelet coefficient amplitude coordinate. Similarly, a second three-dimensional image is constructed by the controller based on the second two-dimensional wavelet coefficient matrix (referred to as Y matrix). The second three-dimensional image may be constructed in a three-dimensional coordinate system in which the x-axis is a time coordinate, the y-axis is a frequency coordinate, and the z-axis is a wavelet coefficient amplitude coordinate.

A structural similarity value is determined by the controller between the first three-dimensional image and the second three-dimensional image. The structural similarity value may be determined using the equation (5).

A residual sum of squares may also be determined by the controller between the first two-dimensional wavelet coefficient matrix and the second two-dimensional wavelet coefficient matrix. The residual sum of squares can be determined using the equation (6).

A low structural similarity threshold is determined by the controller. A high structural similarity threshold is also determined by the controller. The high structural similarity threshold is greater than the low structural similarity threshold. The high structural similarity threshold and the low structural similarity threshold can be determined using the equation (8).

A threshold of residual sum of squares may also be determined by the controller, for example, using the equation (9).

In step 215, the controller determines whether the structural similarity value between the first three-dimensional image and the second three-dimensional image is greater than the low structural similarity threshold and less than the high structural similarity threshold.

In step 220, in response to a determination that the structural similarity value between the first three-dimensional image and the second three-dimensional image is greater than the low structural similarity threshold and less than the high structural similarity threshold, the controller determines an internal fault has occurred to the transmission line. The internal fault refers to a fault occurring on the transmission line, such as the faults K2, K3 and K4 in FIG. 1.

In step 225, the controller controls the protection device to generate a trip signal to cut off the internal fault identified in the step 220. The trip signal may be transmitted by the protection device, for example, through a cable (e.g., an optical fiber communication cable), to breakers positioned on both ends of the transmission line to cut off the internal fault.

Referring back to the step 215, if the structural similarity value between the first three-dimensional image and the second three-dimensional image is less than or equal to the low structural similarity threshold, or greater than the high structural similarity threshold, the method 200 proceeds to step 230. In the step 230, the controller determines whether the structural similarity value is less than or equal to the low structural similarity threshold, and the residual sum of squares is greater than the threshold of residual sum of squares.

If the controller determines the structural similarity value is less than or equal to the low structural similarity threshold, and the residual sum of squares is greater than the threshold of residual sum of squares, the method 200 proceeds to the step 220 in which the controller determines an internal fault has occurred to the transmission line, such as the faults K2, K3 and K4 in FIG. 1. The method 200 then proceeds to the step 225, in which the controller then controls the protection device to generate a trip signal to cut off the internal fault, as described above.

On the other hand, in the step 230, if the controller determines the structural similarity value is greater than the high structural similarity threshold, or the residual sum of squares is less than or equal to the threshold of residual sum of squares, the method 200 proceeds to step 235 in which the controller determines an external fault has occurred to the transmission line. The internal fault refers to a fault occurring externally with respect to the transmission line, such as the faults K1 and K5 in FIG. 1.

In step 240, upon the external fault being identified, the controller controls the protection device to restore the protection device to a normal state.

As seen from the above, the fault type can be identified by the disclosed criteria and a corresponding response is generated.

In some embodiments, in the step 230, when the controller determines the structural similarity value is greater than the high structural similarity threshold, or the residual sum of squares is less than or equal to the threshold of residual sum of squares, the controller may determine that the primary system 100 of the renewable energy power plant is in a normal operation condition. That is, no fault has occurred to the primary system 100 of the renewable energy power plant.

IV. Dynamic Simulation and Experiment Verification

Figure 3:
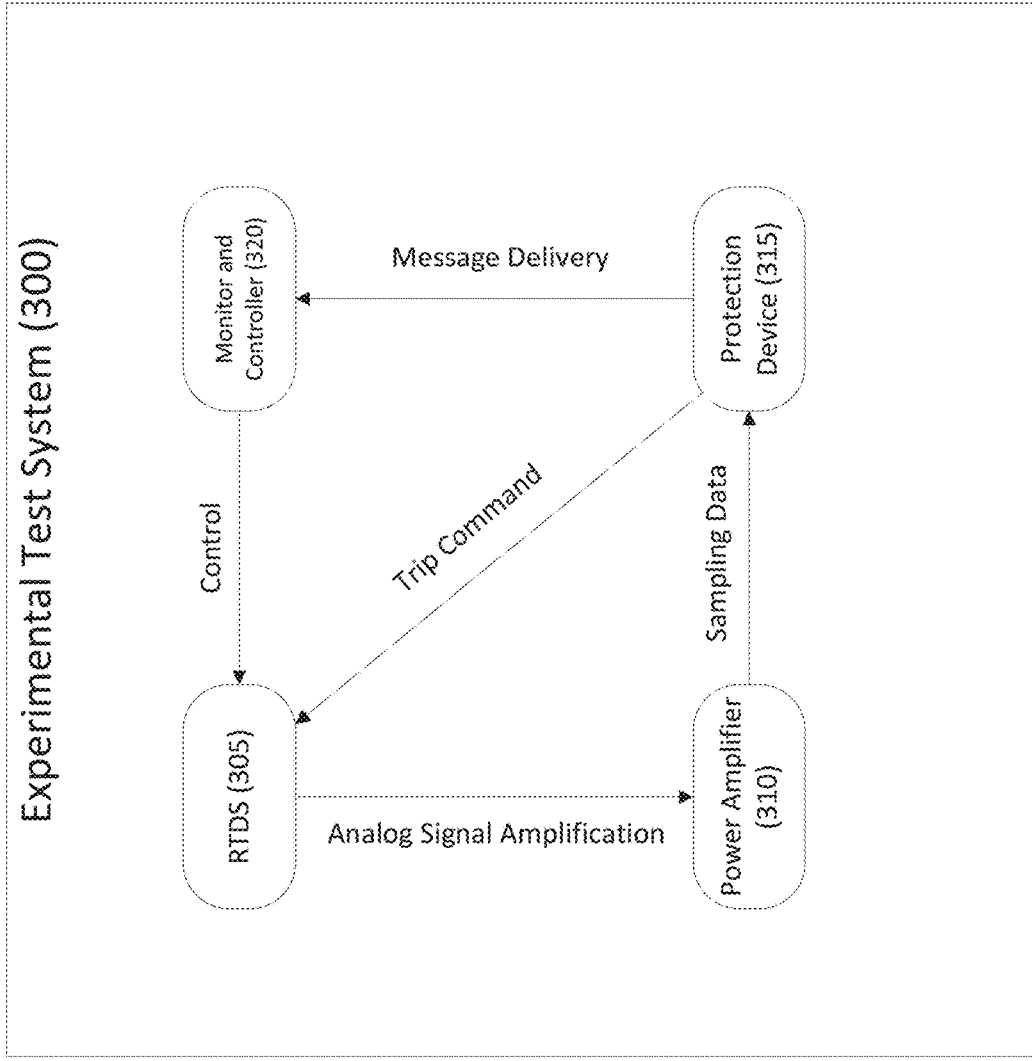
FIG. 3 shows a physical structure diagram of an example experimental test system according to an embodiment of the present disclosure.

To verify the performance of the disclosed protection based on structural similarity and square error method, a dynamic hardware-in-loop simulation system 300 with integrated large-scale wind farms (as shown in FIG. 1) is built in real time digital simulator (RTDS), according to the actual topological structure and parameters of an example wind farm, as shown in FIG. 3. The system 300 may comprise a RTDS 305, a power amplifier 310, a protection device 315, and a controller 320. The disclosed protection algorithm is solidified in the protection device 315, which is connected to the RTDS system 305 by cables for communication (e.g., optical fiber cables). The electrical analog current signals of the integrated wind farm are transmitted from the RTDS 305 output cards to the sampling card of the protection device 315 through the cables, and then the protection device performs real-time operations according to the equation (7), which can perform the structural similarity and square error method based pilot protection disclosed herein. The analog current signal transmitted from the RTDS 305 may be amplified by the power amplifier 310 prior to being sampled by the protection device 315. The controller 320 may control the protection device 315 to perform the disclosed protection algorithm, for example, by means of message delivery. The length of data sampling window is set to be about 20 ms throughout simulation test in section IV, taking into account the speed and reliability of protection.

Type-III and type-IV wind farms are selected separately for renewable energy sources in FIG. 1. The rated capacity of the example wind farm is about 300 MW, and the voltage level of the transmission line is about 220 kV. The length of the transmission line from the wind farm to the external system is about 40 km. The detailed parameters of simulation model are shown as Table 1 and Table 2. According to FIG. 1, the fault locations are set at the external proximal end of the outgoing line on the W side, 25%, 50%, and 75% of the outgoing transmission line, and the external proximal end of the S side, which are referred to as K1, K2, K3, K4 and K5, respectively.

TABLE 1

| model parameters of renewable energy sources | | |
| --- | --- | --- |
| Type of power | Parameters | Value |
| Type-III Wind farm | Single turbine capacity | 1.5 MW |
| | Rated voltage/frequency | 0.69 kV/50 Hz |
| | Stator resistance/inductance | 0.008 pu/0.168 pu |

TABLE 1-continued

| model parameters of renewable energy sources | | |
| --- | --- | --- |
| Type of power | Parameters | Value |
| | Rotor resistance/inductance | 0.006 pu/0.152 pu |
| | Mutual inductance | 3.48 pu |
| | Numbers of wind turbine | 200 |
| | Voltage/capacitance of DC bus | 1.1 kV/0.0092 F |
| | PI constant of current loop on rotor side | 0.85 pu/0.03 pu |
| | PI constant of power loop on rotor side | 0.9 pu/0.05 pu |
| | PI constant of voltage loop on grid side | 3.0 pu/0.13 pu |
| | PI constant of current loop on grid side | 1.21 pu/0.01 pu |
| Type-IV Wind farm | Single turbine capacity | 3.3 MW |
| | Rated voltage/frequency | 2.2 kV/50 Hz |
| | Voltage/capacitance of DC bus | 1.2 kV/4500 g |
| | Parameters of LCL filter | 1.1 mH/200 µF/124 µH |
| | Numbers of wind turbine | 90 |
| | PI constant of voltage loop | 0.75 pu/0.875 pu |
| | PI constant of current loop on | 0.35 pu/0.005 pu |

TABLE 2

| parameters of circuit and main transformer | | |
| --- | --- | --- |
| Model name | Parameters | Value |
| Transmission line | Positive-sequence impedance | 0.076 + j0.338 Ω/km |
| | Zero-sequence impedance | 0.284 + j0.824 Ω/km |
| | Positive-sequence capacitance | 0.0086 µF/km |
| | Zero-sequence capacitance | 0.0061 F/km |
| | Length | 40 km |
| | Rated voltage | 220 kV |
| Collector line | Equivalent resistance | 0.11 Ω |
| | Equivalent inductance | 409.5 µH |
| Main transformer | Rated capacity | 100 MVA |
| | Ratio | 35 kV/220 kV |
| | Connection mode | YNd |
| | Short-circuit impedance | 6% |

Because the fault current provided by renewable energy power plants is controlled by a fault ride through strategy, it mainly embodies the characteristics of frequency offset and low-order harmonics. In this example embodiment, the frequency range of analysis is set to 10-200 Hz, and the frequency step is 10 Hz.

A. Protection Performance of Different Fault Locations and Types

In order to cover all types of faults, dynamic simulation validation is carried out by using many types of faults, which may include AG (phase A to ground fault), BC (phase B to phase C fault), BCG (phase B to phase C to ground fault) and ABC (three phase fault). The sampling frequency is 5 kHz.

Figure 4:
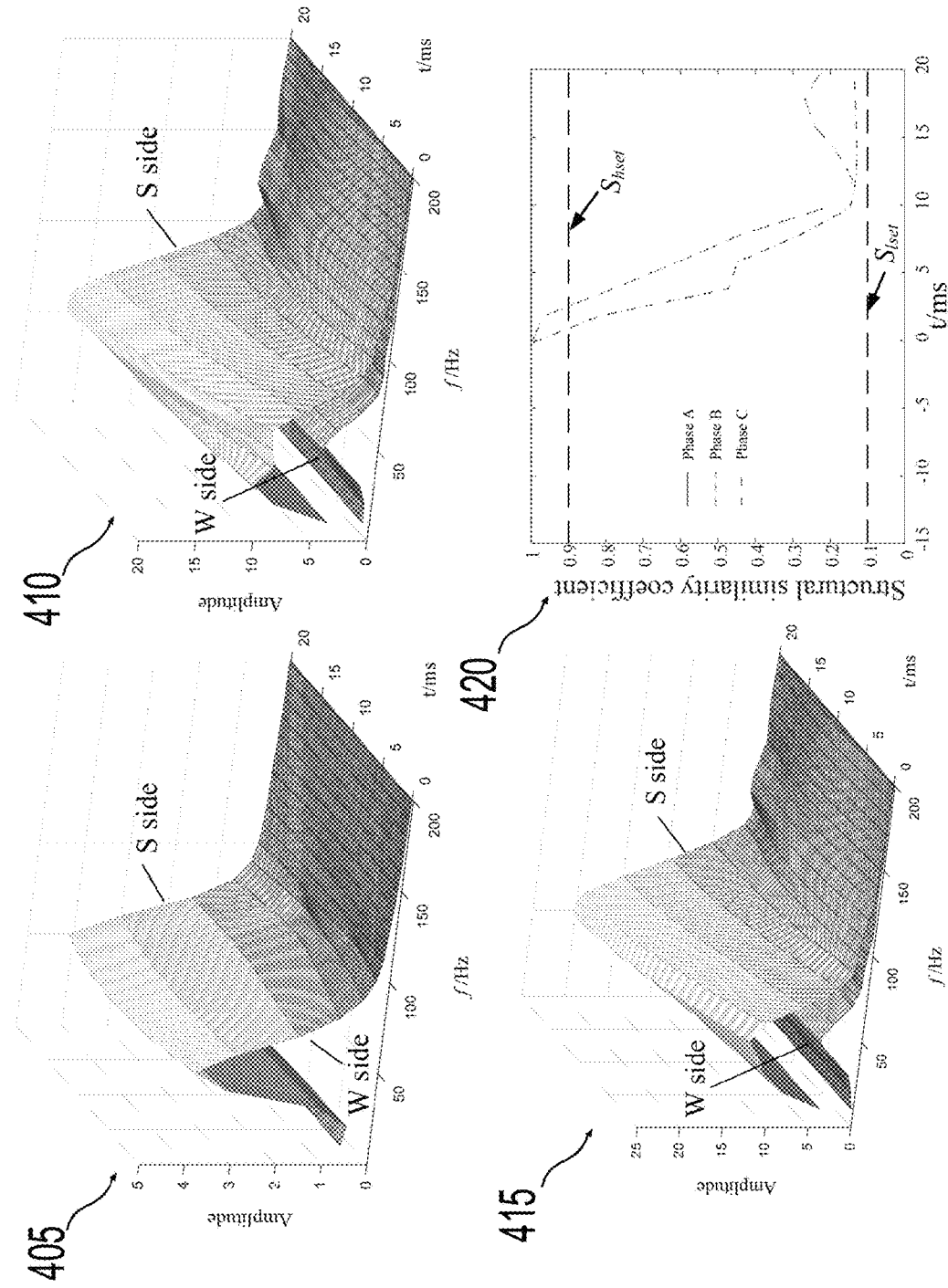
FIG. 4 shows transient currents measured on both sides of a transmission line and structural similarity when an internal phase B to phase C (BC) fault occurs on the transmission line according to an embodiment of the present disclosure.

FIG. 4 shows the wavelet coefficients of three phase transient currents and protection performance based on structural similarity calculation of the type-IV wind farm during a BC fault. In this example, the internal fault location is set as K3 at the midpoint of the transmission line, and the fault time is set to be 0 ms.

The diagram 405 in FIG. 4 illustrates example three-dimensional images of wavelet coefficients of phase A fault current. In this example, the phase A is a non-fault phase. As shown in the diagram 405, the wavelet coefficients of the current at the W side and the S side of the non-fault phase A are identical based on Kirchhoff's law, so the three-dimensional images on both sides coincide completely.

The diagram 410 in FIG. 4 illustrates example three-dimensional images of wavelet coefficients of phase B fault current. The diagram 415 in FIG. 4 illustrates example three-dimensional images of wavelet coefficients of phase C fault current. In this example, each of the phase B and the phase C is a fault phase. As shown in the diagram 410 and the diagram 415, for the fault phase, the fault current characteristics between renewable sources (i.e., the W side) and synchronous system (i.e., the S side) are different. From the image point of view, the wavelet coefficients of the W side current are small and have non-power frequency characteristics. The wavelet coefficients of the S side current have large amplitudes, which are characterized by the power frequency characteristics. Based on this difference, the disclosed protection method can accurately identify fault.

The diagram 420 in FIG. 4 illustrates structural similarity coefficients of the phases A, B and C during an internal fault. As shown in the diagram 420, in this example, the calculated structural similarity coefficient/value between the three-dimensional image of the W side and the three-dimensional image of the S side is about 0.999, which can indicate no fault occurs to the phase A; the calculated structural similarity coefficient between the three-dimensional image of the W side and the three-dimensional image of the S side for the phase B is about 0.234, which can indicate an internal fault occurs to the phase B; and the calculated structural similarity coefficient between the three-dimensional image of the W side and the three-dimensional image of the S side for the phase C is about 0.110, which can indicate an internal fault occurs to the phase C.

In order to systematically verify the performance of the disclosed protection principle, the calculation values of structural similarity under different fault types and different fault location scenarios are given in Table 3. The structural similarity values in Table 3 are calculated from sampled data within 20 ms after a fault occurs.

TABLE 3 calculated structural similarity coefficients for different types of internal and external faults

| Fault Location | Fault Type | Type-IV wind farm | | | Type-III wind farm | | |
| --- | --- | --- | --- | --- | --- | --- | --- |
| | | Phase A | Phase B | Phase C | Phase A | Phase B | Phase C |
| K1 | AG | 0.984 | 0.993 | 0.992 | 0.994 | 0.990 | 0.999 |
| | BC | 0.998 | 1.000 | 0.999 | 0.999 | 1.000 | 1.000 |
| | BCG | 0.995 | 0.999 | 0.991 | 0.996 | 1.000 | 0.999 |
| | ABC | 0.994 | 0.998 | 0.994 | 0.995 | 1.000 | 0.992 |
| K2 | AG | 0.116 | 1.000 | 0.992 | 0.149 | 0.992 | 0.997 |
| | BC | 0.999 | 0.251 | 0.110 | 1.000 | 0.272 | 0.189 |
| | BCG | 0.999 | 0.201 | 0.102 | 1.000 | 0.193 | 0.184 |
| | ABC | 0.150 | 0.118 | 0.162 | 0.107 | 0.217 | 0.104 |
| K3 | AG | 0.102 | 0.992 | 0.996 | 0.117 | 1.000 | 0.996 |
| | BC | 1.000 | 0.216 | 0.110 | 1.000 | 0.256 | 0.144 |
| | BCG | 0.999 | 0.194 | 0.213 | 1.000 | 0.171 | 0.196 |
| | ABC | 0.157 | 0.294 | 0.231 | 0.244 | 0.113 | 0.194 |
| K4 | AG | 0.109 | 0.999 | 0.997 | 0.146 | 1.000 | 0.994 |
| | BC | 0.999 | 0.247 | 0.104 | 1.000 | 0.228 | 0.248 |
| | BCG | 0.997 | 0.204 | 0.195 | 0.998 | 0.140 | 0.251 |
| | ABC | 0.128 | 0.157 | 0.252 | 0.137 | 0.221 | 0.194 |
| K5 | AG | 0.990 | 0.993 | 0.998 | 0.999 | 0.997 | 0.999 |
| | BC | 1.000 | 0.999 | 0.986 | 1.000 | 0.999 | 0.999 |
| | BCG | 1.000 | 0.996 | 0.998 | 1.000 | 0.995 | 0.994 |
| | ABC | 0.999 | 1.000 | 0.986 | 0.989 | 1.000 | 0.999 |

As shown in Table 3, when external faults occur at K1 or K5, the structural similarity coefficients of all phases are greater than 0.9, so the protection method disclosed here can identify the faults as external faults. When internal faults occur at K2, K3 or K4, the structural similarity coefficients of fault phases are greater than 0.1 and less than 0.9, so the protection method disclosed herein can identify the fault as internal faults, and the protection device would generate a trip signal to cut off the internal faults. Accordingly, it demonstrates that the novel protection principle disclosed herein can reliably and sensitively identify the internal and external faults at different fault scenarios (such as different types of wind farms, different fault types, and different fault locations). The effectiveness of the protection based on structural similarity disclosed herein is thus verified.

B. Effects of Fault Resistance on Protection Performance

The most common fault of transmission line nay be a single-phase grounding fault. Generally, there is a fault resistance in single-phase grounding fault, so it is necessary to check the adaptability of the disclosed protection method when the fault with resistance occurs. The maximum fault resistance can be about 50Ω, which may depends on arc resistance. In this example embodiment, the fault resistance is set to 25Ω, 50Ω, 75Ω and 100Ω, respectively in the simulation. Taking a grounding fault of phase A passing through the above fault resistances at K3 as an example, the structural similarity coefficients are calculated at 20 ms after the fault, which are shown in Table 4.

TABLE 4 calculated structural similarity coefficients for different fault resistance

| Fault resistance/ Ω | Type-IV wind farm | | | Type-III wind farm | | |
| --- | --- | --- | --- | --- | --- | --- |
| | Phase A | Phase B | Phase C | Phase A | Phase B | Phase C |
| 25 | 0.365 | 1.000 | 1.000 | 0.396 | 1.000 | 0.997 |
| 50 | 0.436 | 1.000 | 0.994 | 0.487 | 0.999 | 1.000 |
| 75 | 0.529 | 0.996 | 1.000 | 0.513 | 1.000 | 0.999 |
| 100 | 0.621 | 0.997 | 0.999 | 0.601 | 0.996 | 1.000 |

The performance of the disclosed protection method is determined by the structural similarity of waveforms on both sides of the transmission line, instead of relying on the magnitude of short-circuit current. When a high resistance ground fault occurs in the protection area, the short-circuit current amplitude may be small. But its waveform characteristics are still determined by the nature of the power sources, and the current waveforms on both sides of the transmission line are still different. As shown in the Table 4, the structural similarity coefficients still conform to the protection criterion as determined in the equation (7). Therefore, the disclosed protection method is able to withstand a high transition resistance fault.

C. Protection Performance in Scenario of Reclosing with Permanent Fault

Converters in renewable energy power plants need stable external voltage to operate normally, so the sequence of reclosing in industrial application is that the S side takes precedence over the W side. Due to the reclosing sequence, the current of W side may be 0, and the current of S side may be fault current. In this scenario, the structural similarity tends to be zero, and the protection criterion is switched to the square error method. Table 5 shows the calculated values of square error criterion (i.e., the residual sum of squares) when reclosing at each fault point (i.e., K1, K2, K3, K4 and K5) after the A phase permanent grounding fault.

TABLE 5 calculated values of square error criterion

| Fault Type | Fault Location | Type-IV wind farm | | | Type-III wind farm | | |
|---|---|---|---|---|---|---|---|
| | | Phase A | Phase B | Phase C | Phase A | Phase B | Phase C |
| AG | K1 | 0.384 | 0.245 | 0.346 | 0.256 | 0.156 | 0.234 |
| | K2 | 242.74 | 0.275 | 0.299 | 365.76 | 0.210 | 0.336 |
| | K3 | 587.81 | 0.255 | 0.321 | 472.12 | 0.237 | 0.220 |
| | K4 | 229.74 | 0.383 | 0.394 | 351.42 | 0.451 | 0.387 |
| | K5 | 0.485 | 0.334 | 0.442 | 0.369 | 0.410 | 0.531 |

As shown in Table 5, the square error method disclosed herein can enlarge the difference between two groups of data (i.e., the sampled current data from the S side and the sampled current data of the W side). When an internal permanent fault occurs, the breaker of S side recloses preferentially, which results in the short circuit current amplitude of S side tens of times as much as the load current. However, the circuit breaker of W side is not closed, so there is no fault current on the W side. The calculated value of square error criterion is determined by the short circuit current on the S side.

When an external permanent fault occurs, the traversing current is still flowing through the transmission line, and the calculated value of the square error criterion approaches to 0. Therefore, the square error criterion method disclosed herein can accurately identify internal and external faults in scenarios of reclosing with permanent faults.

D. Protection Performance Considering Different Capacities of Renewable Power Sources In this example, the capacity of renewable energy power plants is set at 0, 20, 50, 100, 200 and 300 MW, respectively. The performance of the disclosed protection method is verified under different fault types. The calculated values of structural similarity and square error with different capacities are given in Table 6.

TABLE 6 calculated structural similarity coefficients and square error criterion values with different capacities

| Capacity (MW) | Fault Type | Type-IV wind farm | | | Type-III wind farm | | |
|---|---|---|---|---|---|---|---|
| | | Phase A | Phase B | Phase C | Phase A | Phase B | Phase C |
| 0 | AG | 493.28 | 0.241 | 0.356 | 501.24 | 0.211 | 0.205 |
| | BC | 0.316 | 456.01 | 401.89 | 0.348 | 502.31 | 483.62 |
| | BCG | 0.223 | 512.38 | 500.24 | 0.238 | 498.66 | 501.00 |
| | ABC | 468.21 | 512.04 | 482.33 | 478.45 | 498.23 | 500.11 |
| 20 | AG | 0.128 | 0.999 | 1.000 | 0.104 | 1.000 | 1.000 |
| | BC | 1.000 | 0.174 | 0.102 | 0.999 | 0.223 | 0.215 |
| | BCG | 0.997 | 0.177 | 0.200 | 0.998 | 0.262 | 0.222 |
| | ABC | 0.164 | 0.158 | 0.221 | 0.167 | 0.173 | 0.211 |
| 50 | AG | 0.146 | 1.000 | 0.999 | 0.105 | 0.995 | 0.998 |
| | BC | 1.000 | 0.191 | 0.310 | 1.000 | 0.266 | 0.284 |
| | BCG | 1.000 | 0.305 | 0.202 | 1.000 | 0.391 | 0.144 |
| | ABC | 0.158 | 0.149 | 0.261 | 0.167 | 0.272 | 0.236 |
| 100 | AG | 0.102 | 0.992 | 0.996 | 0.117 | 1.000 | 0.996 |
| | BC | 1.000 | 0.216 | 0.110 | 1.000 | 0.256 | 0.244 |
| | BCG | 0.999 | 0.194 | 0.213 | 1.000 | 0.271 | 0.196 |
| | ABC | 0.157 | 0.294 | 0.231 | 0.244 | 0.113 | 0.194 |
| 200 | AG | 0.168 | 0.999 | 0.999 | 0.186 | 1.000 | 1.000 |
| | BC | 1.000 | 0.275 | 0.204 | 1.000 | 0.236 | 0.277 |
| | BCG | 0.998 | 0.263 | 0.322 | 0.999 | 0.240 | 0.291 |
| | ABC | 0.227 | 0.264 | 0.271 | 0.245 | 0.271 | 0.294 |
| 300 | AG | 0.290 | 0.999 | 1.000 | 0.210 | 1.000 | 0.999 |
| | BC | 1.000 | 0.299 | 0.246 | 1.000 | 0.257 | 0.279 |
| | BCG | 1.000 | 0.286 | 0.274 | 1.000 | 0.295 | 0.275 |
| | ABC | 0.240 | 0.284 | 0.268 | 0.232 | 0.211 | 0.236 |

As shown in Table 6, if the output capacity of renewable energy power plants is 0, the protection criterion is switching to ② in the equation (7). Similar to the subsection C in section IV, the square error method can identify various types of faults sensitively, and the disclosed protection can operate reliably.

When the output capacity of renewable energy power plants ranges from 20 to 300 MW, the protection criterion is ① in the equation (7). The fault characteristics of the renewable energy sources are mainly determined by the inverter control system and the fault ride through control strategy. The capacity of the renewable energy sources only affects the magnitude of short-circuit current, but does not affect the waveform characteristics of the short-circuit current. Therefore, the structural similarity criterion can still be used to identify faults by waveform differences.

E. Comparison of Protection Performance Between Conventional Ratio-Restrained Differential Protection and Disclosed Protection Assuming that the current phasor at the W side is $\dot{I}_w$, the current phasor at the S side is $\dot{I}_s$, the conventional ratio-restrained differential protection criterion can be expressed by the following formula (10).

$$\begin{cases} I_d > I_{op0} \\ I_d > kI_r \end{cases} \quad (10)$$

where $I_d$ is a differential value, which can be expressed as $$I_d = |\dot{I}_w + \dot{I}_s|.$$

$I_{op0}$ is a startup value. $I_r$ is a restrain value, which can be expressed as $$I_r = |\dot{I}_w - \dot{I}_s|.$$

k is a restrained coefficient, which may be set to 0.5.

Figure 5:
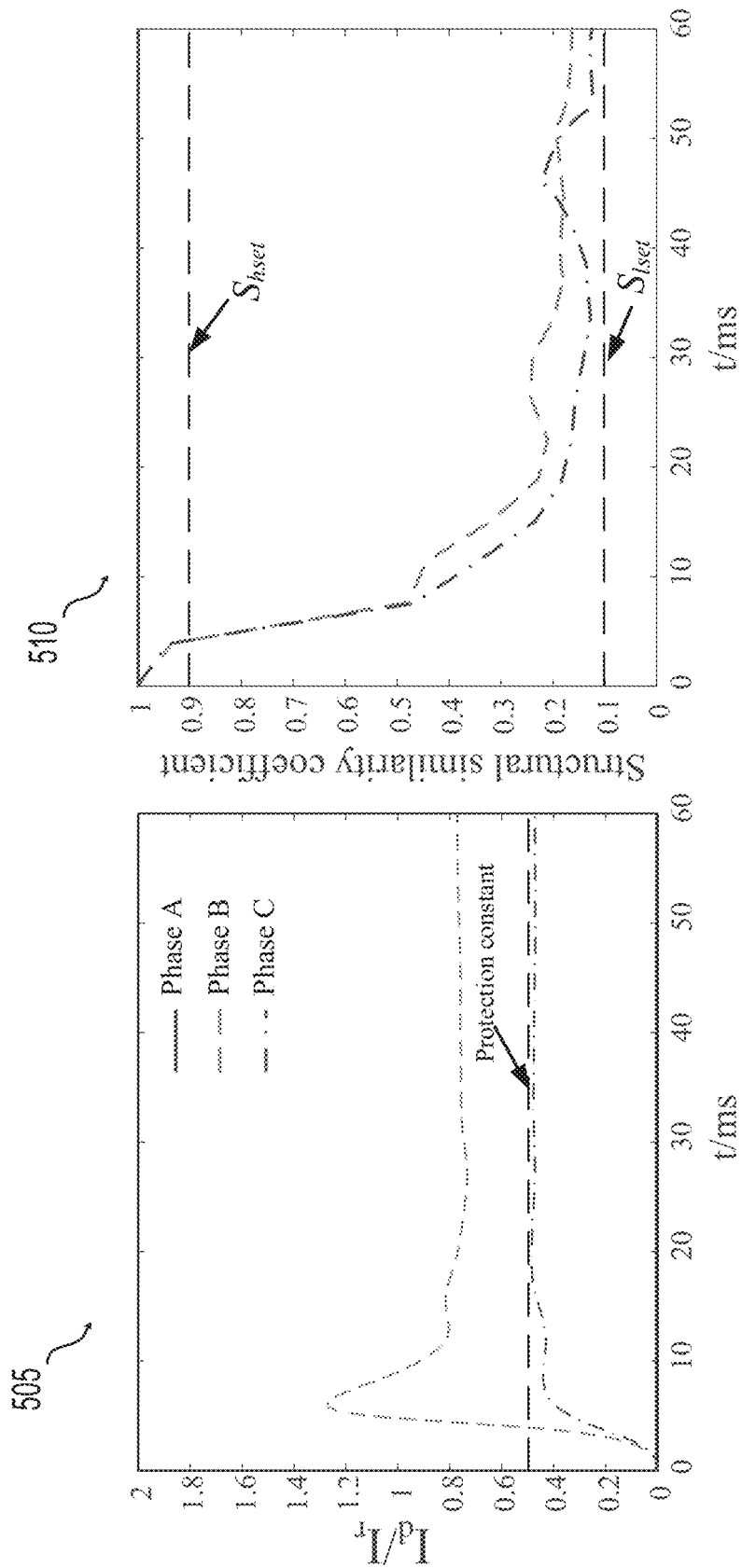
FIG. 5 shows an example performance comparison between a conventional current differential pilot protection and the disclosed protection according to an embodiment of the present disclosure.

In the case of renewable energy station accessing a weak system (e.g., the capacity ratio of renewable energy station to synchronous system is 1:4), the above conventional current differential protection has a possibility of protection rejection when a phase-to-phase fault occurs on the transmission line. The reason is that the distortion of the short-circuit current provided by the renewable energy source leads to the situation that the phase angle between the short-circuit currents of fault phases on both sides of the transmission line is greater than 90 degrees, thus the differential current $I_d$ is less than the restraining current (i.e., the restrained value $I_r$), FIG. 5 shows an example performance comparison between a conventional current differential pilot protection and the disclosed protection according to an embodiment of the present disclosure. The diagram 505 in the FIG. 5 illustrates an example performance of the above conventional differential protection. As shown in the diagram 505, the ratio of differential current to restrained current for the phase C is lower than the protection constant (i.e., the restrain coefficient k), so the conventional protection cannot operate correctly. In this scenario, it is necessary to reduce the restrain coefficient k to ensure that the conventional differential protection can correctly identify the fault. However, the tolerance of the conventional differential protection to unbalanced current may be reduced, and the conventional differential protection can face the risk of malfunction due to the reduction of restrain coefficient k.

The diagram 510 in the FIG. 5 illustrates an example performance of the protection disclosed herein. As shown in the diagram 510, it can be seen that the disclosed protection can identify the faults quickly and accurately. Compared with the conventional differential protection, the disclosed protection has a better performance in the scenario of centralized integration of large-scale renewable energy power plants.

F. Comparison Between Power Frequency Protection and Disclosed Protection Algorithm For the power frequency protection, the existing studies mainly focus on calculation accuracy improvements, but they still rely on the power frequency measurement. However, non-power frequency component of the renewable energy source might dominate the fault current and the calculation accuracy of the power frequency phasor can be reduced. An improving adaptive distance relay may be used.

For example, with the power and voltage fluctuation of the wind farm considered, an adaptive distance relay setting for lines connecting wind farms may be used. The protection criterion is as follows in equation (11).

$$Z_m \in Z_B \quad (11)$$

where $Z_m$ is a measured impedance of a protection device. $Z_B$ is a boundary impedance range of the distance protection based on the adaptive setting method. E indicates that the measured impedance falls into the boundary impedance range.

Figure 6:
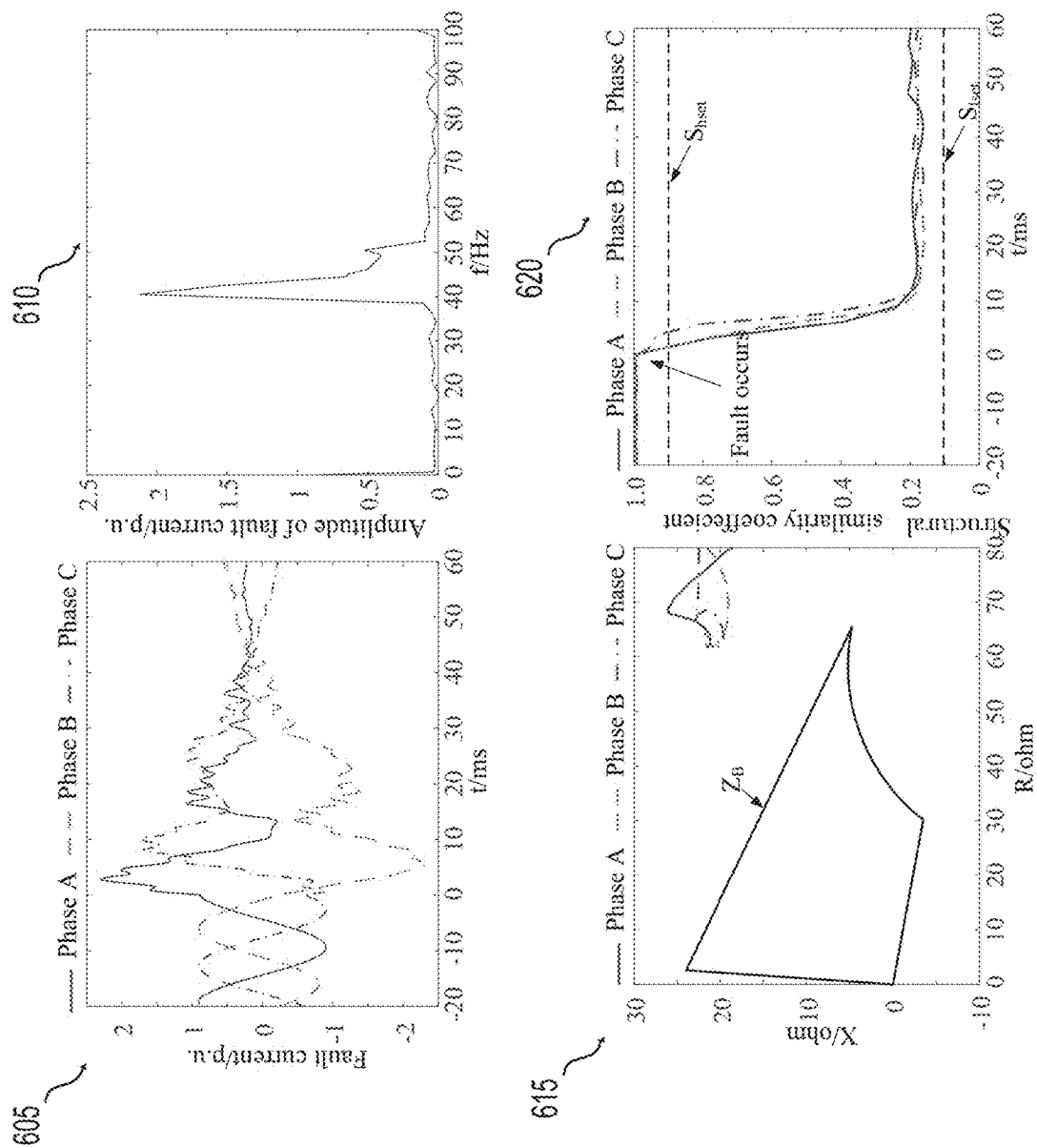
FIG. 6 shows example fault current provided by renewable energy sources and the performance of structural similarity based protection according to an embodiment of the present disclosure.

Taking the three-phase fault of doubly-fed wind farm as an example, the analysis is shown in the FIG. 6. FIG. 6 shows example fault current provided by renewable energy sources and the performance of structural similarity based protection according to an embodiment of the present disclosure. The diagram 605 in FIG. 6 illustrates example fault currents of a type-III wind farm under a three-phase fault. The diagram 610 in FIG. 6 illustrates an example fault current of phase A in frequency domain. The diagram 615 in FIG. 6 illustrates an example adaptive distance relay. The diagram 620 in FIG. 6 illustrates structural similarity coefficients.

It can be seen that the crowbar of doubly-fed induction wind turbines is put into operation, and then the wind turbine enters the asynchronous motor mode. The short circuit current has a large rotor-speed-related frequency component (about 40 Hz), while the power frequency component (about 50 Hz) is relatively small (as shown in the diagram 610 in FIG. 6). It reduces the accuracy of power frequency phasor calculation. When the difference between rotor speed and synchronous speed is large, the power frequency component in the short circuit current tends to be a very small value. This can cause incorrect operation of the power frequency based protection. As shown in the diagram 615 in FIG. 6, the measured impedance is large and outside the boundary impedance range $Z_B$, due to the small power frequency component of short circuit current. However, this improving method cannot reliably identify faults.

The protection method disclosed herein does not depend on the power frequency phasor calculation. Instead, the waveform difference between the short-circuit current waveforms of renewable energy sources and synchronous generators is directly used as a fault characteristic quantity to identify faults. Even if the rotor-speed-related frequency component presents, the disclosed protection can still correctly and rapidly identify the faults (as shown in the diagram 620 in FIG. 6).

G. Comparison of Protection Performance Between Conventional Waveform Similarity Based Protection and Disclosed Protection Conventional waveform similarity principle protection relies entirely on the difference of short-circuit current waveforms between renewable energy power plants and synchronous generators. For example, Pearson coefficient or cosine similarity are used to characterize the waveform similarity between the two waveforms to identify faults. However, the conventional waveform similarity based protection method can only be applied to the scenario where the currents on both sides of a transmission line is not zero. In the case of weak output of the renewable energy source or reclosing with permanent fault of the renewable energy source, the sampled current value on one side of the transmission line is zero. The conventional waveform similarity based protection method then causes a 0/0 abnormal calculation, which leads to the failure of the conventional waveform similarity based protection principle. Pearson coefficient and cosine similarity calculations are shown in equation (12). The performance comparison of the conventional waveform similarity protection and the disclosed protection is shown in Table 7.

$$\cos(X, Y) = \frac{\sum_{i=1}^{n}(x_i \cdot y_i)}{\sqrt{\sum_{i=1}^{n} x_i^2} \sqrt{\sum_{i=1}^{n} y_i^2}} = \frac{\sum_{i=1}^{n}(0 \cdot y_i)}{\sqrt{\sum_{i=1}^{n} 0^2} \sqrt{\sum_{i=1}^{n} y_i^2}} = \frac{0}{0} \quad (12)$$

$$\text{pear}(X, Y) = \frac{\sum_{i=1}^{n}\left(x_i - \frac{1}{n}\sum_{j=1}^{n} x_j\right)\left(y_i - \frac{1}{n}\sum_{j=1}^{n} y_j\right)}{\sqrt{\sum_{i=1}^{n}\left(x_i - \frac{1}{n}\sum_{j=1}^{n} x_j\right)^2} \sqrt{\sum_{i=1}^{n}\left(y_i - \frac{1}{n}\sum_{j=1}^{n} y_j\right)^2}} = \frac{0}{0}$$

where $\cos(X,Y)$ is the computational formula of cosine similarity, and $\text{pear}(X,Y)$ is the computational formula of Pearson similarity.

TABLE 7 performance of different protection methods

| Fault condition | Performance of different methods | | |
|---|---|---|---|
| | Cosine criterion | Pearson criterion | Proposed criterion |
| Weak output of renewable sources | 0/0 Incorrect | 0/0 Incorrect | square error criterion Correct |
| Reclosing with permanent fault | 0/0 Incorrect | 0/0 Incorrect | square error criterion Correct |

Assuming that the current sampling value in X is zero, the formulas of the two conventional waveform similarity protections are faced with 0/0 type calculation anomaly, and the protections are invalid at this time, as shown in Table 7. In this scenario, the calculated value of the structural similarity in the protection principle disclosed herein approaches to zero. At this time, the square error criterion is used to correctly identify various types of faults, as shown in Table 7. According to the subsections C and D in section IV, the disclosed protection can operate correctly.

V. Field Test

Although most of the conventional protection principles are proved to be effective by theoretical analysis and simulation verification, they might not work as expected under real fault conditions. In order to detect the performance of protection device disclosed herein in field operation, a short-circuit test is conducted on the transmission line of a real renewable energy power station. In this field test example, the real renewable energy power station is a type-III wind farm, whose rated capacity is 99 MW. The rated capacity of the main transformer is 200 MVA and the rated voltage of the main transformer is 220/35 kV, whose connection form is YNd. The primary connection mode is the same as that depicted in FIG. 1. The outgoing line's rated voltage is 220 kV, and its total length is about 36 km. The fault in the field test is set as a phase-A-to-ground short circuit occurred at 10 km from the wind farm. The current signal sampling frequency is 5 kHz. The equivalent zero-sequence impedance is low because the neutral point of the high voltage side of the main transformer in the wind farm is directly grounded. Moreover, the wind farm presents obvious weak feed characteristics in the process of fault traversing, so the zero-sequence component is the main composition of short-circuit current from wind farm side, as shown in the diagram 705 in FIG. 7. The diagram 705 in FIG. 7 illustrates the three phase currents in the example filed test.

Figure 7:
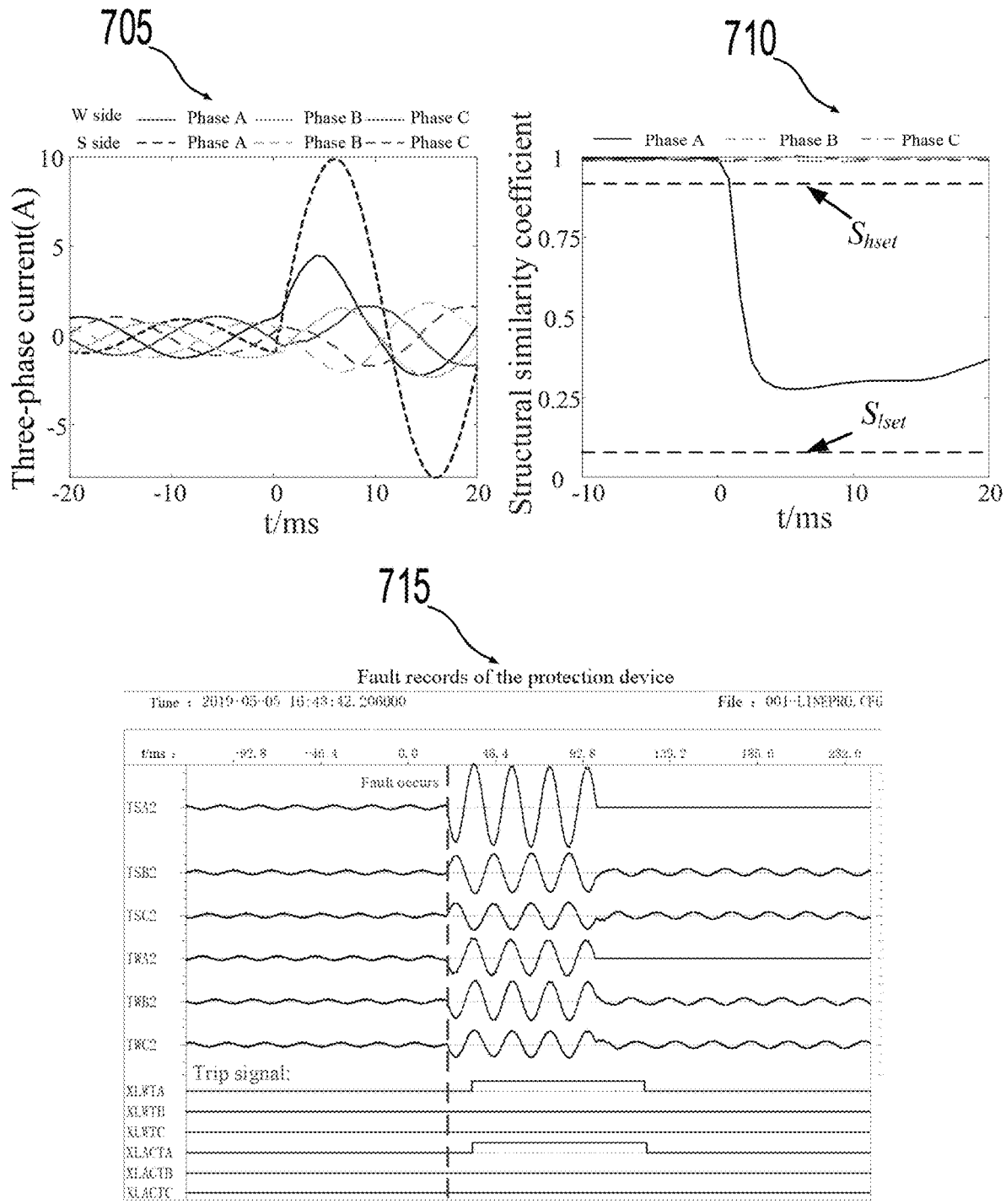
FIG. 7 shows three phase currents and structural similarity coefficients of an internal phase A-to-ground (AG) fault type in an example field test according to an embodiment of the present disclosure.

The diagram 710 in FIG. 7 illustrates the three-phase structural similarity coefficients in the example file test calculated using the equation (5). In order to highlight the operation performance of the protection disclosed herein, the protection setting constants (i.e., $S_{hset}$ which is a high structural similarity threshold, and $S_{lset}$ which is a low structural similarity threshold) is marked with black dotted lines in the diagram 710 in FIG. 7. It can be observed in the diagram 710 that the structural similarity coefficient of the phase A is smaller than the protection setting constant $S_{hset}$ in about 5 ms, and thus protection of the phase A can operate reliably and quickly. Fault records of the protection device are shown in the diagram 715 in FIG. 7, and the trip signal is generated within 10 ms by the protection device. As shown above, the effectiveness of pilot protection based on structural similarity disclosed herein can be proved by the field test data.

The fault transient current provided by renewable energy sources presents characteristics of limited amplitude, controlled phase angle, and frequency offset, which can cause the performance of conventional protection based on power frequency phasor to be degraded, and/or the risk of malfunction and action rejection. A novel pilot protection based on structural similarity and square error method is disclosed herein to solve the problems associated with conventional protections by utilizing the difference of transient waveform characteristics between renewable energy sources and conventional synchronous machines during internal faults. The following conclusions may be drawn.

The structural similarity based pilot protection criterion/method can solve problems of performance degradation and incorrect operations associated with conventional protections due to the integration of large-scale renewable energy power plants. It can be applicable to distorted and restricted fault currents provided by all kinds of renewable energy power plants. Dynamic simulation experiments and field test results can prove that all types of short-circuit faults can be identified reliably and sensitively. The disclosed protection has better performance in high resistance grounding faults. The disclosed protection method also has good adaptability in weak output of renewable energy power plants and reclosing with permanent fault.

In some embodiments, the sampling synchronization technology may be used in the protection device to ensure that the disclosed protection algorithm is not affected by the communication delay. The protection device calculates the communication delay and the sampling time error automatically. The protection device can tune the sampling time to achieve the sampling synchronization. Therefore, the communication delay would not affect the protection performance.

In some embodiments, in order to consider the communication reliability and protection speed, the present disclosure selects every four sampling points to update the data. At the sampling frequency of 5 kHz, four sampling points correspond to 0.8 ms. Considering the communication delay and calculation time, the protection logic operation time should be about 1 ms to about 2 ms. In the industrial application, it is necessary to set three times to meet the criteria before sending the tripping command. The protection device relies on the relay closing to generate tripping command, and the inherent delay of the relay is about 3 ms to about 5 ms. In addition, the maximum delay time of the starting element of the protection device is about 1 ms. According to the above discussion, the actual operation time of the protection device is about 12 ms.

VI. Technical Implementation of the Disclosed Method

Figure 8:
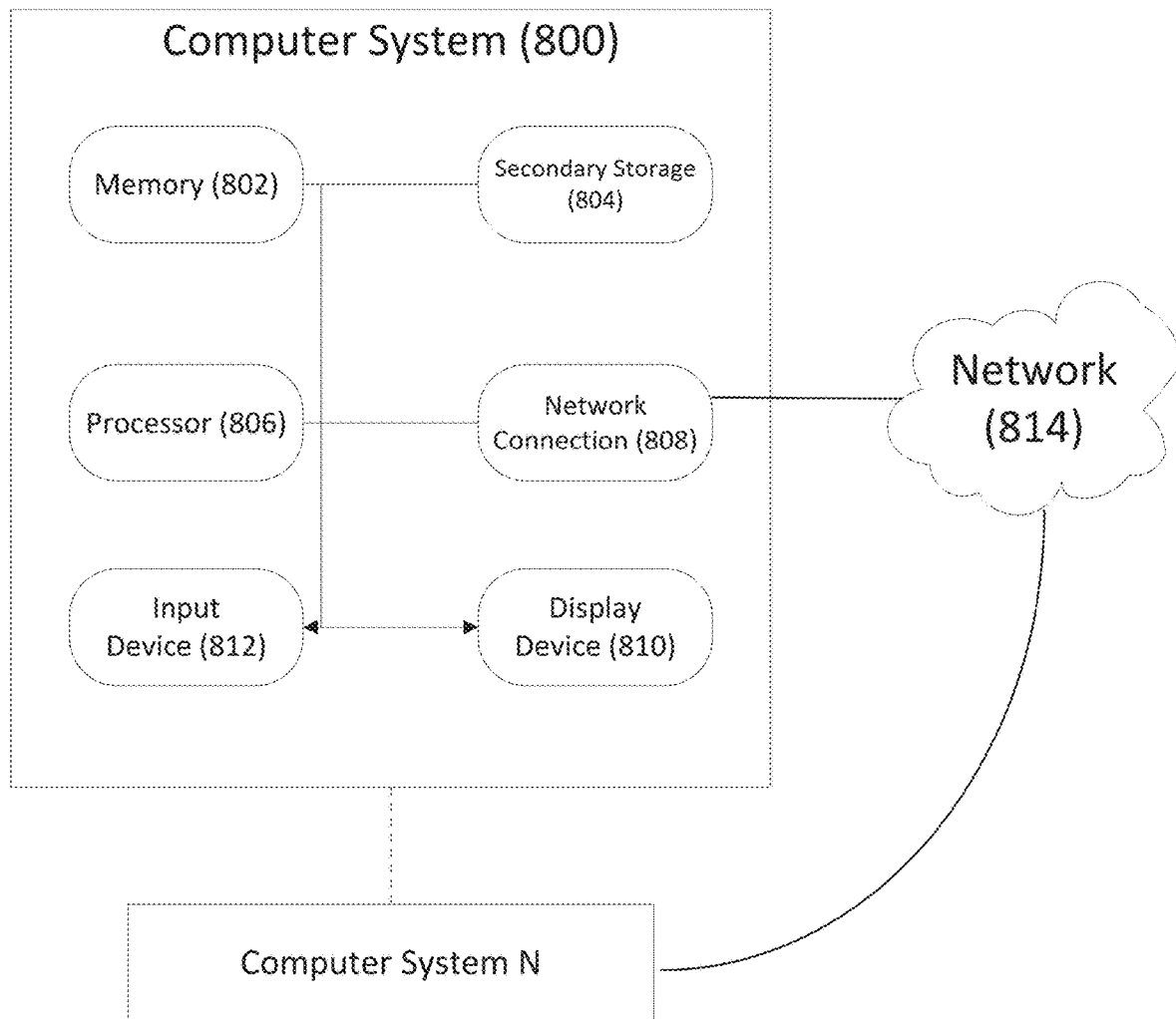
FIG. 8 shows a computer system that may implement a disclosed protection method according to an embodiment of the present disclosure.

In some embodiments, the protection system disclosed herein may comprise a computer system to implement the disclosed protection method. The computer system may act as a controller to control executions of, for example, the protection device, the flow chart of the protection method 200 in FIG. 2, the experimental test system 300 in FIG. 3, determinations of the structural similarity values, square error criteria determination, and various other calculations and simulations disclosed herein. FIG. 8 illustrates an exemplary computer system 800 that can be used to implement the disclosed method partially or wholly. The computer system 800, or other computer systems similarly configured, may include and execute one or more subsystem components to perform functions described herein, including the steps/blocks of various flow processes, measurements and/or analyses described above. Likewise, a mobile device, a cell phone, a smartphone, a laptop, a desktop, a notebook, a tablet, a wearable device, a server, etc., which includes some of the same components of the computer system 800, may run an application (or software) and perform the steps and functionalities described above. The computer system 800 may connect to a network 814, e.g., Internet, or other network, to receive inquiries, obtain data, and/or transmit information as described above.

The computer system 800 typically includes a memory 802, a secondary storage device 804, and a processor 806. The computer system 800 may also include a plurality of processors 806 and be configured as a plurality of, e.g., bladed servers, or other known server configurations. The computer system 800 may also include a network connection device 808, a display device 810, and an input device 812.

The memory 802 may include RAM or similar types of memory, and it may store one or more applications for execution by the processor 806. The secondary storage device 804 may include a hard disk drive, floppy disk drive, CD-ROM drive, or other types of non-volatile data storage. The processor 806 executes the application(s), such as those described herein, which are stored in the memory 802 or secondary storage 804, or received from the Internet or other network 814. The processing by processor 806 may be implemented in software, such as software modules, for execution by computers or other machines. These applications preferably include instructions executable to perform the system and subsystem component functions and methods described above and illustrated in the Figs. herein. The applications preferably provide graphical user interfaces (GUIs) through which users may view and interact with the subsystem components.

The computer system 800 may store one or more database structures in the secondary storage 804, for example, for storing and maintaining the information/data necessary to perform the above-described functions. Alternatively, such information/data may be in storage devices separate from these components.

Also, as noted, the processor 806 may execute one or more software applications to provide the functions described in this specification, specifically to execute and perform the steps and functions in the process flows, measurements and/or analyses described above. The GUIs may be formatted, for example, as web pages in HyperText Markup Language (HTML), Extensible Markup Language (XML) or in any other suitable form for presentation on a display device depending upon applications used by users to interact with the computer system 800.

The input device 812 may include any device for entering information into the computer system 800, such as a touch-screen, keyboard, mouse, cursor-control device, microphone, digital camera, video recorder or camcorder. The input and output device 812 may be used to enter information into GUIs during performance of the methods described above. The display device 810 may include any type of device for presenting visual information such as, for example, a computer monitor or flat-screen display (or mobile device screen). The display device 810 may display the GUIs and/or output from sub-system components (or software).

Examples of the computer system 800 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 800 is shown in detail, the computer system 800 may use multiple computer systems or servers as necessary or desired to support the users and may also use back-up or redundant servers to prevent network downtime in the event of a failure of a particular server. In addition, although the computer system 800 is depicted with various components, one skilled in the art will appreciate that the computer system 800 can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 800, to perform a particular method, such as methods described above.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A renewable energy integrated power system having a structural based pilot protection system, comprising:
   a first current transformer (CT) disposed in a first end portion of a transmission line of the renewable energy integrated power system, the first CT configured to connect a renewable energy source to the transmission line, and the renewable energy source being an integrated wind farm;
   a second CT disposed in a second end portion of the transmission line, the second end portion being opposite to the first end portion and the second CT configured to connect the transmission line to an external synchronous grid; and
   the structural based pilot protection system,
   wherein the structural based pilot protection system comprises a protection device and a controller configured to control the protection device, the controller and the protection device being in signal communication with the renewable energy integrated power system, and the controller configured to:
   start the protection device;
   sample current signals by the protection device from the first end portion and the second end portion, respectively;
   apply a wavelet transform to the sampled current signals of the first end portion to obtain a first two-dimensional wavelet coefficient matrix;
   apply the wavelet transform to the sampled current signals of the second end portion to obtain a second two-dimensional wavelet coefficient matrix;
   construct a first three-dimensional image based on the first two-dimensional wavelet coefficient matrix;
   construct a second three-dimensional image based on the second two-dimensional wavelet coefficient matrix;
   determine a structural value between the first three-dimensional image and the second three-dimensional image
   determine a low structural threshold using and a high structural threshold the high structural threshold being greater than the low structural threshold;
   determine whether the structural value is greater than the low structural threshold and less than the high structural threshold;
   in response to that the structural value is determined to be greater than the low structural threshold and less than the high structural threshold, determine that an internal fault has occurred to the transmission line;
   in response to that the internal fault is determined, cause the protection device to generate a trip signal to cut off the internal fault;
   in response to that the structural value is determined to be less than or equal to the low structural threshold, determine a residual sum of squares between the first two-dimensional wavelet coefficient matrix and the second two-dimensional wavelet coefficient matrix;
   determine a threshold of residual sum of squares
   determine whether the residual sum of squares is greater than the threshold of residual sum of squares;
   in response to that the structural value is determined to be less than or equal to the low structural threshold and the residual sum of squares is determined to be greater than the threshold of residual sum of squares, determine that an internal fault has occurred to the transmission line, and cause the protection device to generate a trip signal to cut off the internal fault; and
   in response to that the structural value is determined to be greater than the high structural threshold, or the residual sum of squares is less than or equal to the threshold of residual sum of squares, determine that an external fault has occurred to the transmission line, and restore the protection device to a normal state.

* * * * *